(12) United States Patent
Hyde et al.

(10) Patent No.: US 9,912,938 B2
(45) Date of Patent: Mar. 6, 2018

(54) SYSTEMS AND METHODS TO CONFIRM THAT AN AUTOSTEREOSCOPIC DISPLAY IS ACCURATELY AIMED

(71) Applicant: Elwha LLC, Bellevue, WA (US)

(72) Inventors: Roderick A. Hyde, Redmond, WA (US); Jordin T. Kare, San Jose, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 15/443,332

(22) Filed: Feb. 27, 2017

(65) Prior Publication Data

US 2017/0171532 A1    Jun. 15, 2017

Related U.S. Application Data

(63) Continuation of application No. 13/665,563, filed on Oct. 31, 2012, now Pat. No. 9,584,797.

(51) Int. Cl.
*H04N 13/04* (2006.01)
(52) U.S. Cl.
CPC ..... *H04N 13/0402* (2013.01); *H04N 13/0425* (2013.01); *H04N 13/0484* (2013.01)
(58) Field of Classification Search
CPC ........... H04N 13/0402; H04N 13/0484; H04N 13/0425
See application file for complete search history.

(56) References Cited

U.S. PATENT DOCUMENTS

| | | |
|---|---|---|
| 6,008,484 A | 12/1999 | Woodgate et al. |
| 6,163,336 A | 12/2000 | Richards |
| 6,377,295 B1 | 4/2002 | Woodgate et al. |
| 6,496,218 B2 | 12/2002 | Takigawa et al. |
| 6,752,498 B2 | 6/2004 | Covannon et al. |
| 6,757,422 B1 | 6/2004 | Suzuki et al. |
| 7,705,876 B2 | 4/2010 | Starkweather et al. |
| 7,843,449 B2 | 11/2010 | Krah |
| 2002/0186348 A1 | 12/2002 | Covannon et al. |
| 2006/0139447 A1 | 6/2006 | Unkrich |
| 2008/0068372 A1 | 3/2008 | Krah |
| 2010/0118118 A1 | 5/2010 | Krah |
| 2011/0032346 A1 | 2/2011 | Kleinberger |
| 2012/0044330 A1 | 2/2012 | Watanabe |
| 2014/0022619 A1 | 1/2014 | Woodgate et al. |
| 2014/0320614 A1 | 10/2014 | Gaudreau |

*Primary Examiner* — Neil Mikeska
(74) *Attorney, Agent, or Firm* — Foley & Lardner LLP (57) ABSTRACT

A autostereoscopic display system includes an autostereoscopic display configured to project images representing a left-eye view and a right-eye view of an image, an emitter configured to emit a tracer beam having a directional relationship to that of the projected images, a sensor configured to detect reflections of the tracer beam, and a processing circuit. The processing circuit is configured to control an emission of the tracer beam, receive feedback data from the sensor, use the feedback data to determine an impact site on the viewer corresponding to the tracer beam and adjust a direction of the tracer beam based on the impact site.

35 Claims, 8 Drawing Sheets

SYSTEMS AND METHODS TO CONFIRM THAT AN AUTOSTEREOSCOPIC DISPLAY IS ACCURATELY AIMED

CROSS-REFERENCE TO RELATED APPLICATIONS

The present application is a continuation of U.S. patent application Ser. No. 13/665,563, filed Oct. 31, 2012, which is incorporated herein by reference in its entirety and for all purposes.

BACKGROUND

Autostereoscopic arrays direct different scenes to each of a viewer's eyes. This can be used, for example, to generate perception of 3D depth in images, or to display separate images to each viewer. However, if the aiming is not accurate, it can result in poor quality viewing. Thus, in addition to tracking a viewer, there is a need for the autostereoscopic array to confirm that the projected images are indeed projected to the viewer's eyes.

SUMMARY

One exemplary embodiment relates to an autostereoscopic display system, including an adjustable autostereoscopic display configured to project images representing a left-eye view and a right-eye view of an image, an emitter configured to emit a tracer beam having a directional relationship to that of the projected images, a sensor configured to detect reflections of the tracer beam, and a processing circuit. The processing circuit is configured to control an emission of the tracer beam, receive feedback data from the sensor, and use the feedback data to determine an impact site on the viewer corresponding to the tracer beam and adjust a direction of the tracer beam based on the impact site.

Another exemplary embodiment relates to a method of aiming stereoscopic images, including configuring an adjustable autostereoscopic display to project images representing a left-eye view and a right-eye view of an image, controlling an emission of a tracer beam having a directional relationship to that of the projected images, receiving feedback data from a sensor configured to detect reflections of the tracer beam, and using the feedback data to determine an impact site on the viewer corresponding to the tracer beam adjust a direction of the tracer beam based on the impact site.

Another exemplary embodiment relates to a non-transitory computer-readable medium having instructions stored thereon, the instructions include instructions to configure an adjustable autostereoscopic display to project images representing a left-eye view and a right-eye view of an image, instructions to control an emission of a tracer beam having a directional relationship to that of the projected images, instructions to receive feedback data from a sensor configured to detect reflections of the tracer beam, and instructions to use the feedback data to determine an impact site on the viewer corresponding to the tracer beam and adjust a direction of the tracer beam based on the impact site.

The invention is capable of other embodiments and of being carried out in various ways. Alternative embodiments relate to other features and combinations of features as may be generally recited in the claims.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for confirming that an adjustable autostereoscopic display is accurately aimed at a viewer are shown and described. An adjustable autostereoscopic display may be an autostereoscopic display configured in a manner as to allow the adjustment of the direction and focus of light rays emitted therefrom. Other aspects of the light rays (e.g., modulation, intensity, etc.) may also be adjustable. The adjustable autostereoscopic display may use a parallax barrier, lenticular array, micromirrors, or any other suitable means of adjusting its light rays. A person may be viewing such an autostereoscopic display (e.g., a 3D television, a computer display, a handheld gaming device, or any other adjustable autostereoscopic device) and may have separate images projected to his or her eyes. If the person alters his or her position with respect to the display and any projected images, the projected images may no longer be hitting the person's eyes, leading to a poor viewing experience. For example, the projected 3D images may lose their appearance of depth, or the projected images may appear to be blurry. A viewer's location and eyes may be tracked, and the projections adjusted in an attempt to continue to hit the viewer's eyes. This may be achieved without any viewer-mounted equipment. In this manner, a better viewing experience may be provided to the viewer. However, this type of method for controlling the projection directions constitutes open-loop control. Such systems use a sensor to determine where the projections should be sent (i.e., to the viewer's eyes) and then use a control mechanism (for instance, lateral motion of an array of parallax barriers or lenticules) to direct the projections to this proper location. While such systems are designed to aim the projections to the location identified by the sensor, they generally do not actually confirm that the projections do in fact accurately hit their target. Accordingly, the system may believe it is accurately delivering projections to the viewer's eyes, while in fact it is not, causing the viewer to suffer from an unsatisfying viewing experience. It is therefore of interest to provide a closed-loop projection system, which detects where on the viewer the projections hit, and adjusts their aimpoint to ensure that the projections properly reach the eyes of the viewer. For additional discussion of an open-loop system that utilizes a parallax device, see, e.g., U.S. Pat. No. 6,377,295 to Woodgate, et al.

In one embodiment, a closed-loop projection system uses a tracer beam, emitted by an emitter. The emitter may be a separate emitter which projects a tracer beam of light. Alternatively, the emitter may be the autostereoscopic display itself, where the tracer beam is encoded (e.g., time encoding, spectral encoding, etc.) within the display's projections. The direction of the tracer beam has a known (generally fixed) relationship to that of the display's projections; for instance, it might be in the same direction as the left or right projection, might be midway between them, or the like. In an embodiment, the direction of the tracer beam is controlled by the same adjustment system that controls the direction of the projection beams, such that the directional relationship remains fixed as the direction of the tracer beam or the projections is adjusted. In other words, as a control system shifts the aim of the tracer beam, the projections undergo a corresponding shift, and vice versa. In an embodiment, the projection system can comprise two parallel, closely spaced arrays, a source array containing light sources, and a beam array containing beam defining elements, such as parallax barriers collimator slits, or lenticules. The source array can include light sources defining display pixels, and can also contain one or more emitter sources used for the tracer beam; the emitter and display sources may be shared or separate. The beam array may contain elements which interact with display sources to form the projection beams as well as one or more elements which interact with the emitter(s) to form one or more tracer beams. By occupying fixed locations on common array surfaces, the projection beams and the tracer beam can be configured to have a defined directional relationship (e.g., the tracer beam may be midway between the two projections, may be above or below them, etc.). As the two surfaces are laterally displaced in order to steer the beams towards a moving viewer, the directional relationship between the projection beams and the tracer beam is maintained; the surfaces may undergo corresponding angular motion. A sensor (e.g., a camera, a photodetector, etc.) may receive feedback corresponding to where on a viewer the tracer beam hits. The sensor may be the same sensor used to track a viewer. Based on the feedback, a processing circuit may be used to adjust the direction of the tracer beam (and accordingly that of the projections) so that they hit a desired impact site (e.g., the viewer's eyes, the viewer's forehead, etc.). In this way the processing circuit may confirm that the tracer beam hits a known site on the viewer, and hence (via the known directional relationship between the tracer beam and the projections) can confirm that the projections reached the viewer's eyes. The projection impacts are confirmed by the processing circuit without the use of any viewer-mounted equipment. Additionally, a viewer's head and eyes may be tracked using a sensor (e.g., a camera, etc.), and this information may also be used in adjusting the tracer beam, and confirming projections from the autostereoscopic display. According to a contemplated scenario, a person may be watching a 3D movie on an autostereoscopic television, configured according to the systems and methods herein. The person is seated in one location on his or her couch. The television projects stereoscopic images to the eyes of the person, still seated in the same position. The person may adjust positions and move to the other side of the couch. The television uses a sensor to detect the changed position of the person and locate the new position of the person's head. The television set then automatically adjusts the projection of stereoscopic images so that they reach the person's eyes. The television confirms via a tracer beam that the projections are properly reaching the person's eyes. In this manner, the person may enjoy the 3D movie in the new position, with the appropriate left and right images automatically reaching the person's left and right eyes, respectively.

According to another contemplated scenario, a man and woman may be playing a gaming system coupled to an autostereoscopic television, which is configured according to the systems and methods herein. The television projects two different images to the man and woman simultaneously, each corresponding to content relating to their character in the game (e.g., the man would see game video content related to his character, and the woman would see game video content relating to her character, etc.). The man and woman may alter their head positions while playing the game, and the television detects the changed positions using a sensor, and automatically adjust the projections so that they continue to reach the eyes of the man and woman, respectively. The television confirms via tracer beams that the projections are properly reaching the man's eyes and woman's eyes. In this manner, the man and woman may play a game at the same time, on the same television, with the appropriate images reaching their left and right eyes, respectively. The images remain accurately aimed despite the man and woman changing their head positions.

For purposes of this disclosure, the term "coupled" means the joining of two members directly or indirectly to one another. Such joining may be stationary in nature or moveable in nature and such joining may allow for the flow of electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
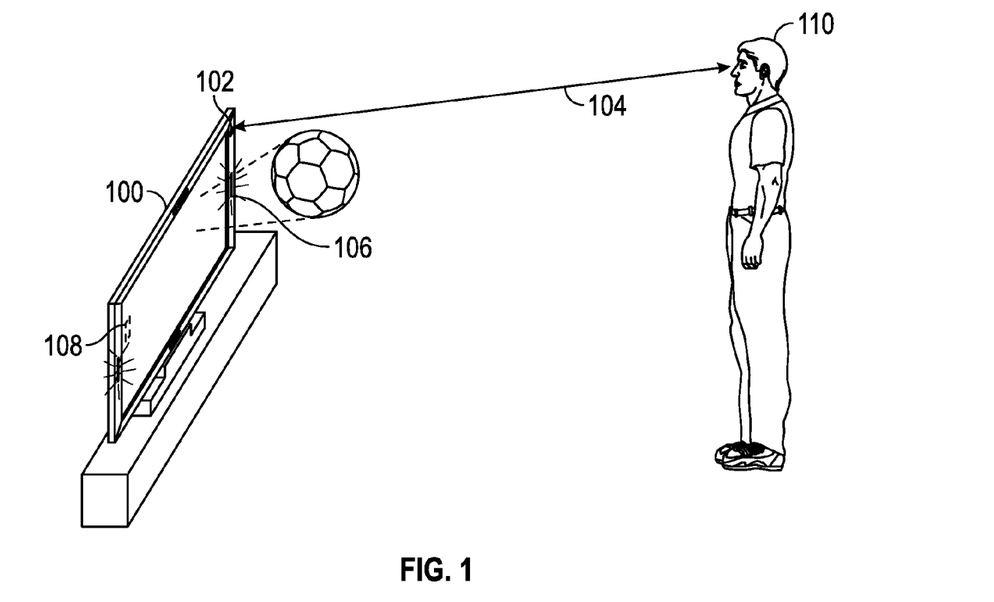
FIG. 1 is a schematic diagram of an autostereoscopic display system, including an adjustable autostereoscopic display, an emitter, a sensor, and a processing circuit, shown according to an exemplary embodiment.

Referring to FIG. 1, autostereoscopic display 100 is shown. Autostereoscopic display 100 is adjustable and includes emitter 102, sensor 106, and processing circuit 108. Tracer beam 104 and viewer 110 are also shown. Autostereoscopic display 100 is depicted as a 3D television, however it may be computer monitor, a gaming device, a cellular phone, or any other device that includes an adjustable autostereoscopic display. Emitter 102 may be configured to emit a tracer beam 104. Tracer beam 104 may be tracer light, visible light of a narrow band, ultra violet light, infrared light, or any other suitable signal. Tracer beam 104 has a directional relationship to that of the projected images. Tracer beam 104 is generally projected in the same direction as that of the images intended to reach a viewer's eyes. For example, tracer beam 104 may be emitted in a direction that is above, below, in between, or offset from the projected images. Emitter 102 may be a separate module coupled to autostereoscopic display 100, or may be autostereoscopic display 100 itself, configured to embed a tracer beam within its projections. There may be a single emitter 102, or a plurality of emitters 102. Sensor 106 is used to detect reflections of tracer beam 104 and reflections of any other projections. Sensor 106 may be a camera, or any other sensor capable of detecting an impact site (e.g., a photodetector, etc.). Sensor 106 may also be configured to track the head and eye location of viewer 110. Processing circuit 108 may compare the reflections of tracer beam 104 to a desired impact site. A desired impact site may be the eyes, nose, center of forehead, midpoint between the eyes, etc., of viewer 110. Processing circuit 108 is depicted as the processing circuit embedded in autostereoscopic display 100.

It should be understood, that the systems and methods of the present disclosure are not limited based on the type of autostereoscopic display device, the type of the emitter, or the type of sensor. A variety of emitters and sensors are envisioned.

Figure 2:
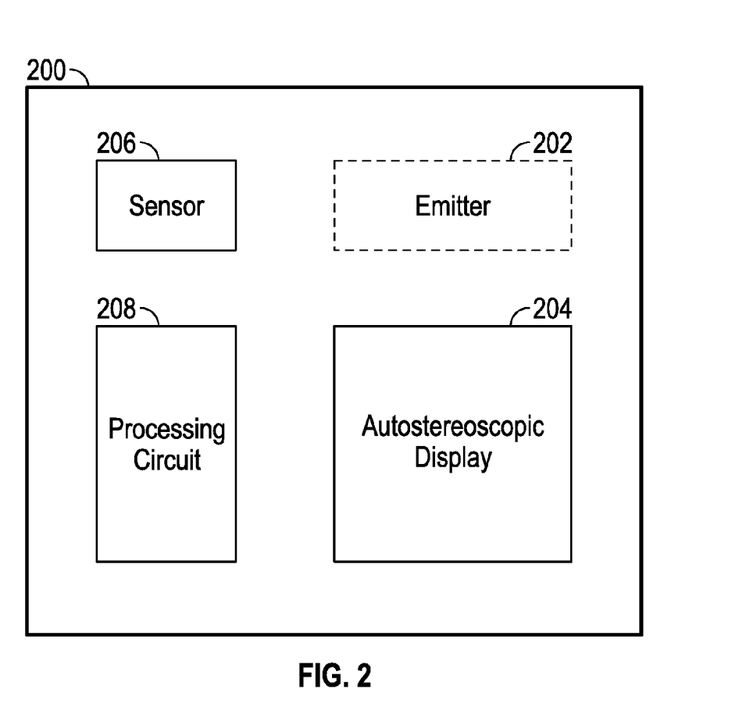
FIG. 2 is a block diagram of an adjustable autostereoscopic display, an emitter, a sensor, and a processing circuit, shown according to an exemplary embodiment.

Referring to FIG. 2, a block diagram of a system 200 for executing the systems and method of the present disclosure is shown. System 200 includes emitter 202, adjustable autostereoscopic display 204, sensor 206, and processing circuit 208. Emitter 202 may be a separate device configured to emit a tracer beam. Alternatively, emitter 202 may be autostereoscopic display 204 itself, configured to embed a tracer beam within its projections. Sensor 206 may detect reflections of a tracer beam, and provide information corresponding to detected reflections to processing circuit 208. Processing circuit 208 controls the generation of the tracer beam and the direction of the tracer beam and of the projections of autostereoscopic display 204. Emitter 202, sensor 206, and processing circuit 208 are coupled to autostereoscopic display 204. While depicted as separate modules in FIG. 2, emitter 202, autostereoscopic display 204, sensor 206, and processing circuit 208 may be part of one device. The systems and methods of the present disclosure are not limited to a single emitter, but any number of emitters 202 may be used.

According to an exemplary embodiment, autostereoscopic display 204 is a 3D projection television, processing circuit 208 is the processing circuit within the television, emitter 202 and sensor 206 are a light generation device and a camera, respectively, both embedded in the television's housing. According to another exemplary embodiment, autostereoscopic display 204 is a digital light projection (DLP) projector, processing circuit 208 is the processing circuit within the projector, sensor 206 is a camera, and emitter 202 is the projection mechanism of the projector. According to another exemplary embodiment, autostereoscopic display 204 is an LED projector, processing circuit 208 is the processing circuit within the projector, sensor 206 is a camera, and emitter 202 is the projection mechanism of the projector.

Figure 3:
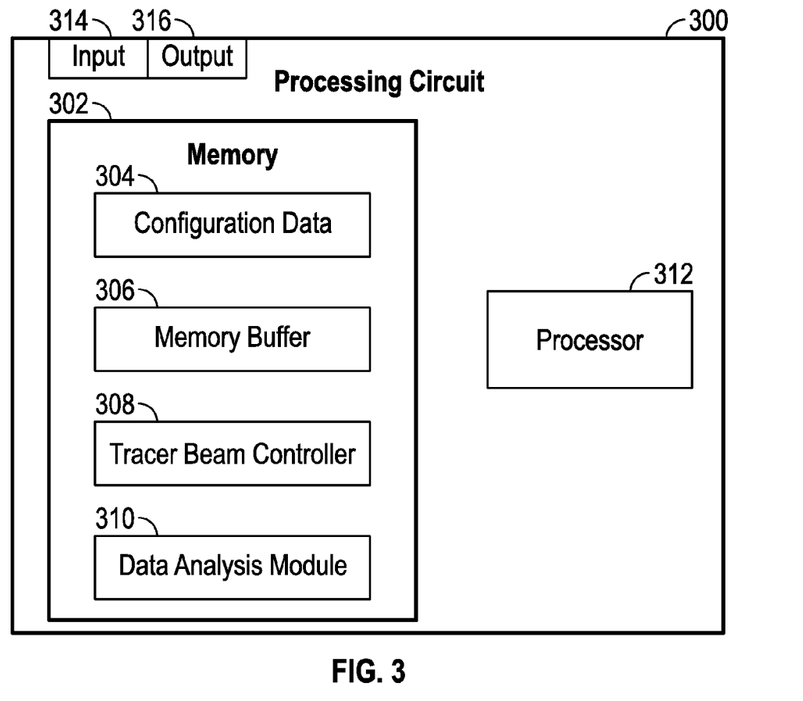
FIG. 3 is a detailed block diagram of a processing circuit, shown according to an exemplary embodiment.

Referring to FIG. 3, a more detailed block diagram of processing circuit 300 for completing the systems and methods of the present disclosure is shown, according to an exemplary embodiment. Processing circuit 300 may be processing circuit 108 of FIG. 1. Processing circuit 300 is generally configured to control the emission of a tracer beam and adjust the output of an autostereoscopic display to maintain accurate aiming. As an example, the tracer beam may be projected as light from an autostereoscopic display, or as light from a separate emitter. Processing circuit 300 may generate signals necessary to cause a tracer beam to start or stop. Processing circuit 300 may also generate signals to cause a tracer beam to modulate or change positions, etc. Processing circuit 300 is further configured to receive an input from an outside source (e.g., a sensor, a camera, components within an autostereoscopic display, etc.). Input may be received continuously or periodically. Processing circuit 300 is configured to process the received input and generate signals necessary to adjust the tracer beam and projections of an autostereoscopic display. Processing circuit 300 uses the input and tracer beam to confirm projections are properly reaching a viewer. Processing circuit 300 may also be configured to track a viewer's location.

Processing circuit 300 includes processor 312. Processor 312 may be implemented as a general purpose processor, an application specific integrated circuit (ASIC), one or more field programmable gate arrays (FPGAs), a group of processing components, or other suitable electronic processing components. Processing circuit 300 also includes memory 302. Memory 302 is one or more devices (e.g., RAM, ROM, Flash Memory, hard disk storage, etc.) for storing data and/or computer code for facilitating the various processes described herein. Memory 302 may be or include non-transient volatile memory or non-volatile memory. Memory 302 may include database components, object code components, script components, or any other type of information structure for supporting the various activities and information structures described herein. Memory 302 may be communicably connected to the processor 312 and include computer code or instructions for executing the processes described herein.

Memory 302 includes configuration data 304. Configuration data 304 includes data relating to processing circuit 300. For example, configuration data 304 may include information relating to interfacing with an autostereoscopic display. This may include the command set needed to interface with video display components, for example, a parallax barrier, a lenticular array, a micromirror array, or other optical splitter, etc. Configuration data may include specification and protocol information for the components of an autostereoscopic display as described herein. As another example, configuration data 304 may include information relating to tolerances or error levels, which may be used in determining when a projected image should be adjusted. Configuration data 304 may include data to configure the communication between the various components of processing circuit 300, and the various components of the systems described herein.

Configuration data 304 may further include scheduling information. The scheduling information may be used by processor 312 to enable or disable certain components of the systems described herein. For example, configuration data 304 may specify that at a certain time only the head and eye tracking methods described below will be enabled, and display adjustment methods will be disabled. In an exemplary embodiment, the scheduling information specifies how often the processing circuit (e.g., processing circuit 300) will attempt to confirm that the autostereoscopic display is accurately aimed at a viewer. For example, the systems and methods to confirm projection accuracy may run every five seconds, etc. Configuration data 304 may further include timing information corresponding to a timing pattern of the tracer beam. For example, configuration data 304 may store a timing pattern to be provided to data analysis module 310 and tracer beam controller 308, which uses the pattern to pulse the tracer beam in a defined manner (e.g., every other microsecond, etc.). However, the scope of the present application is not limited to any defined schedule or particular timing pattern.

Memory 302 includes memory buffer 306. Memory buffer 306 is configured to receive data from a sensor, (e.g. sensor 206 in FIG. 2) through input 314. Memory buffer may also receive data through input 314 from other components within an autostereoscopic display. The data may include image or video data, tracer beam data, radar information, light detection and ranging information, or infrared information. The image or video data, for example, may be data provided by a camera. The data received through input 314 may be stored in memory buffer 306 until memory buffer 306 is accessed for data by the various modules of processing circuit 300. For example, data analysis module 310 may access camera data that is stored in memory buffer 306.

Memory 302 includes tracer beam controller 308. Tracer beam controller 308 is configured to control the generation and spatial positioning of a tracer beam. Tracer beam controller 308 receives emitter specification information from configuration data 304, corresponding to a type of emitter being used. Tracer beam controller 308 receives information from data analysis module 310 corresponding to a viewer's location. This may, for example, include coordinates according to a coordinate system in one, two, or three dimensions. This information may also include distance and angle information. As another example, this information may represent estimated future locations of a viewer. As another example, viewer information may represent specific characteristics of the viewer (e.g., right eye, left eye, first viewer, second viewer, specific viewer identity, etc.). Tracer beam controller 308 interprets this information, and adjusts the tracer beam (or tracer beams) in order to implement the systems and methods disclosed herein.

The tracer beam may be comprised of light suitable for detection by a sensor. The light of the tracer beam may be provided by a separate emitting device or by the scene light of a projection of the autostereoscopic display. In an exemplary embodiment, the tracer beam is configured to use light that is not perceptible to a viewer. In one example, an LED is configured to emit light for use as a tracer beam. In another example, the autostereoscopic display is projecting light corresponding to images of a scene, and the tracer beam is the full scene light or is embedded within the scene light. The tracer beam may be of an intensity greater or lesser than light of the projected images. Tracer beam controller 308 includes all logic necessary for controlling the emission pattern and characteristics of the tracer beam.

In one embodiment, a separate emitter is configured to emit a tracer beam having a defined spectral signature. The spectral signature of the tracer beam is used to distinguish the tracer beam from non-tracer beam projections. As an example, the tracer beam may be light outside a viewable band (e.g., infrared, ultra-violet, etc.) As another example, the tracer beam may be visible light of a specific narrow-bandwidth. As another example, the tracer beam may be of light of a certain polarization. Tracer beam controller 308 is configured to control the emissions of the tracer beam. This may include enabling or disabling the tracer beam, pulsing the tracer beam, increasing or decreasing the intensity of the tracer beam, changing the position of the tracer beam, modulating the tracer beam, etc. Tracer beam controller 308 provides data corresponding to the tracer beam emission pattern and location to data analysis module 310.

In another embodiment, the autostereoscopic display is configured to encode a tracer beam within its projections. The autostereoscopic display may be a flat panel display that uses lenticular arrays, parallax-barriers, micromirrors, or other optical splitters. Tracer beam controller 308 is configured to control the encoded emissions of the tracer beam. As an example, the tracer beam may be light from the autostereoscopic display of a specified narrow band. As another example, the tracer beam may be light of an intensity level that is above the intensity level of the background scene. Tracer beam controller 308 generates the necessary signal for the display to send time-gated pulses (e.g., microsecond pulses, etc.) of tracer beam light according to a defined timing pattern. The timing pattern may be based on a schedule stored in configuration data 304 or memory buffer 306. The timing pattern may be such that the tracer beam is emitted when one or both of images representing a left-eye view or right-eye view are not projected. As another example, the timing pattern may be provided by configuration data 304. Tracer beam controller 308 maintains the timing pattern and intensity, and provides pattern and intensity information to data analysis module 310, which may then use the information in distinguishing the tracer beam from other non-tracer beam light. Data analysis module 310 may also use information provided by tracer beam controller 308 while tracking the spatial location of a viewer.

Tracer beam controller 308 may be configured for use with multiple tracer beams and multiple emitters. It should be understood that the scope of the present application is not limited to a certain number of tracer beams or emitters.

Memory 302 includes data analysis module 310. Data analysis module 310 receives tracer beam information from tracer beam controller 308. Data analysis module 310 further receives configuration information from configuration data 304. Additionally, data analysis module 310 receives sensor information, which is provided by a sensor (e.g. sensor 206 of FIG. 2) through input 314. Data analysis module 310 may also scan the input, determine, and track a viewer's location, and represent the location in data. The location data may be used through the various modules of processing circuit 300. As an example, data analysis module 310 may apply facial recognition algorithms using the sensor information, and may classify and organize a viewer, and the location of the viewer's face. As another example, data analysis module 310 may apply motion detection algorithms using the sensor information, and may determine when a viewer is changing positions. Data analysis module 310 may also apply eye-detection algorithms to determine the left and right eye locations of a viewer, and may adjust an aiming point corresponding to detected eye locations. Data analysis module 310 may be configured for use with multiple viewers. It should be understood that the scope of the present application is not limited to any certain number viewers.

The configuration information received by data analysis module 310 includes data corresponding to the current system utilizing processing circuit 300. For example, this may include information of the number of tracer beam emitters of an autostereoscopic display. This may also include information relating to the emitter, sensor, and autostereoscopic display specifications. For example, the information may be related to the focal length or angle of view of a camera being used as a sensor.

Data analysis module 310 provides information to tracer beam controller 308, so that tracer beam controller may adjust a tracer beam. In an exemplary embodiment, data analysis module 310 receives configuration information corresponding to a type of desired impact site. A desired impact site may be a location on a viewer that the tracer beam or projections are intended to hit. As an example, in an embodiment that uses scene light with an encoded tracer beam, desired impact sites may include the left-eye for light from the left-eye channel, and the right eye for light from the right-eye channel. As another example, in an embodiment that uses a separate emitter to generate a central tracer beam, a desired impact site may be a nose, or a midpoint between the eyes, etc. Data analysis module 310 may access the impact site type information and the sensor information. Data analysis module 310 may generate facial location information of a viewer as described above, and may use the facial location information to generate spatial data of the desired impact site. Data analysis module 310 may provide the desired impact site data to tracer beam controller 308, which uses the data to adjust the tracer beam's aiming point accordingly. As an example, the data may be coordinates according to a coordinate system in one, two, or three dimensions.

Data analysis module 310 may generate signals necessary to adjust a projection of an autostereoscopic display (e.g., autostereoscopic display 204 of FIG. 2). The autostereoscopic display may utilize any number of techniques for projecting images (e.g., flat panels using lenticular arrays, parallax-barriers, micromirrors, optical splitters, etc.) The projected images may be adjusted by controlling the deflection system of the display, or other aspects of the display. As an example, deflection systems may utilize a variety of different optical deflectors (e.g., electrically or mechanically controlled) to control the direction and focus of light rays emitted from the display.

In an exemplary embodiment, data analysis module 310 determines a viewer's location as described above. The viewer's location includes the location of the viewer's eyes. Data analysis module 310 sends the appropriate signals to the deflection system of the display in order to cause the deflectors to adjust such that the direction and focus of light reaches the viewer's eyes. Data analysis module 310 may use the location of the viewer's eyes in determining an aiming point of the autostereoscopic display. For example, the deflectors are adjusted such that projections of light intended for either the left eye or right eye, will be aimed at the left eye or right eye, respectively. In practice, the direction of deflection for each eye may be slightly different for each pixel of the display screen due to the position of the pixel. In other embodiments, data analysis module 310 may provide viewer location information to the deflection system, which may determine the direction of deflection with respect to a reference pixel, and deflect the light from each pixel based on a predefined relationship between the reference pixel and each other pixel.

Data analysis module 310 confirms that a projection is correctly reaching the eyes of the viewer. Data analysis module 310 scans sensor data provided through input 314, where the sensor is configured to detect reflections of the tracer beam, and to detect scene light projected from the autostereoscopic display. Data analysis module 310 compares the tracer beam reflection data to a desired impact site and calculates measurements relating to the comparison. This may include distances, coordinates, etc. Data analysis module 310 uses the measurements to confirm that the direction and focus of light rays emitted from the display are accurately aimed at a viewer. As an example, if data analysis module 310 determines that the tracer beam reflection is not close to the desired impact site, data analysis module 310 may generate signals necessary to adjust a projection direction as discussed above. In another example, a certain tolerance level may be specified by configuration data 304. Data analysis module 310 may use the tolerance level in confirming the projection, and may adjust the projection only if a measurement from a desired impact site to an actual impact site exceeds the tolerance level.

Data analysis module 310 may determine an offset using the tracer beam's aiming point and a direction of a projected image. For example, while an open-loop control system of the display may use sensor information concerning the location of the viewer's eyes to adjust the projection directions so as to nominally cause the projections to arrive at the viewer's eyes, analysis of tracer beam reflections may indicate that the projections are actually offset, for instance by 10 mrad upwards and 8 mrads to the left. Rather than apply this correction directly via closed-loop control with each video frame, data analysis module 310 may use the offset to calibrate the autostereoscopic display, thereby improving the accuracy of the open-loop control system. Given this calibrated offset, the control system can thereafter (for some period of time) use open-loop control augmented by the offset. In some embodiments, the use of this type of tracer-calibrated open-loop control is a viable alternative to performing full closed-loop correction for each video frame. For example, data analysis module 310 may compare the aiming point of the tracer beam and an aiming point of the autostereoscopic display. Data analysis module 310 may generate signals necessary to adjust the autostereoscopic in order to reduce the offset to a desired value and bring the tracer beam's impact site and the impact site of the projected images closer together. Data analysis module 310 may confirm the calibration by scanning sensor data provided through input 314, where the sensor is configured to detect reflections of the tracer beam, and to detect scene light projected from the autostereoscopic display. Calibration of the autostereoscopic display may be performed sporadically (i.e., not for each video frame), or may be based on a time limit or schedule. As an example, configuration data 304 may contain a calibration schedule where the autostereoscopic display is calibrated after every 8 hours of use. In another example, calibration may occur when the autostereoscopic display is powered on or activated. In another example, calibration may occur in response to a request provided via input 314, sent from a system of the autostereoscopic display (e.g., a user voice command, a command initiated by a remote control, a calibration monitoring system of the autostereoscopic display, etc.).

In one embodiment, the tracer beam is configured use light at a 360 nm wavelength, and the sensor is a camera capable of detecting 360 nm light in addition to detecting visible light wavelengths. Data analysis module 310 is configured to scan for 360 nm light within the sensor reflection data. If data analysis module 310 detects the 360 nm light, it will determine the location of 360 nm reflected light, and compare the location to the desired impact site location. Data analysis module 310 will use the comparison data to either confirm or deny that the autostereoscopic display is accurately projecting. If the display is not accurately projecting, data analysis module 310 may use the comparison data to adjust the direction and focus of the tracer beam or light rays emitted from the display in order to aim them at the desired impact site. When the reflected tracer beam light is within an acceptable range from a desired impact site, the autostereoscopic display may be confirmed to be accurately aimed. This process may repeat as necessary (e.g., when data analysis module 310 detects a changed position of a viewer, or per a schedule, etc.).

In one embodiment, scene-light is used for the tracer beam, and the tracer beam is encoded within the scene-light using time gating techniques. As an example, the tracer beam may pulse for one microsecond according to a pattern controlled by tracer beam controller 308. The tracer beam may operate during such pulses at significantly greater intensity than the normal scene light, thereby enhancing its detectability by a time synchronized sensor. Data analysis module 310 receives reflection data from the sensor, as described above. Data analysis module 310 may first distinguish left-eye and right-eye channels of light from each other by using the time gating pattern (for sequential emission displays), or by using spectral or polarization differences between light in the left-eye and right-eye channels (as an example, some autostereoscopic displays use polarization or spectral differences to output the left and right beams in different directions). Data analysis module 310 scans for the tracer beam within the reflection data representing the left and right channels reflections of light. Data analysis module 310 uses the tracer beam pattern data provided from tracer beam controller 308 to determine time slots to scan for the tracer beam.

Figure 4:
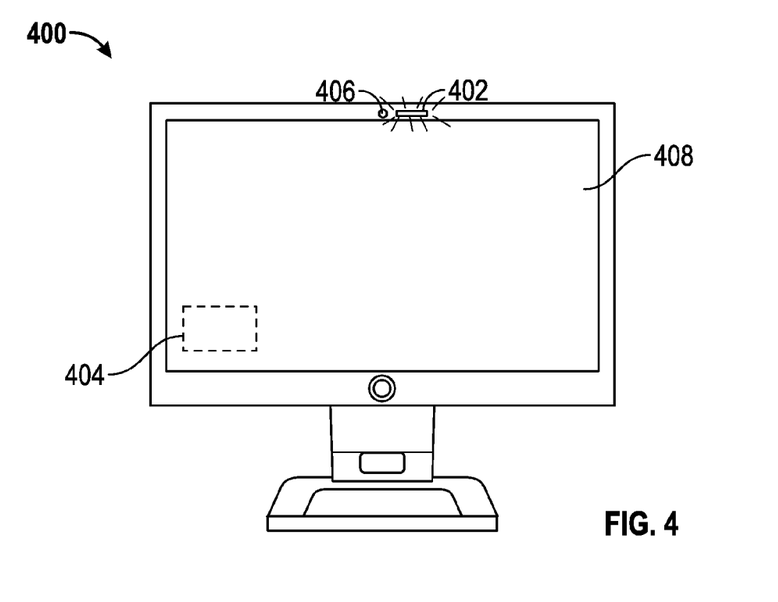
FIG. 4 is a schematic diagram of an autostereoscopic display system, including an adjustable autostereoscopic display, an emitter, a sensor, and a processing circuit, shown according to an exemplary embodiment.

Referring to FIG. 4, autostereoscopic display system 400 is shown according to an exemplary embodiment. Autostereoscopic display system 400 includes adjustable autostereoscopic display 408, sensor 406, processing circuit 404, and emitter 402. Autostereoscopic display 408 may be a 3D computer monitor. Emitter 402 may be an ultraviolet LED, sensor 406 may be a camera or any other suitable photodetector, and processing circuit 404 may be the processing components of the monitor. In an alternative embodiment, processing circuit 404 includes the processing components of a computing device coupled to the monitor. According to an exemplary embodiment, emitter 402 is configured to emit a tracer beam, and sensor 406 is configured to detect reflections of light. Processing circuit 404 is configured to communicate with the camera and LED. Processing circuit 404 is further configured to control the direction and focus of light rays emitted from the monitor as well as that of the tracer beam from the emitter so that they maintain a directional relationship. This and other similar embodiments are useful in situations where 3D computing applications are required. As an example, a researcher using the monitor to view the helix structure of DNA would have an improved experience, as the monitor would track and confirm that its projections are accurately aimed. In an alternative embodiment, emitter 402 may be an infrared transmitter. In yet another embodiment, emitter 402 may be an LED of visible light, but of a narrow band.

Figure 5:
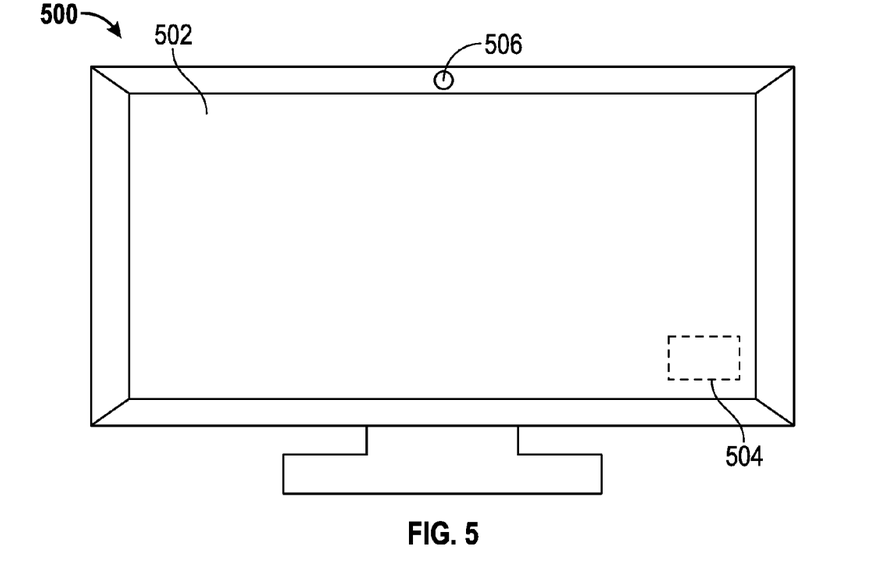
FIG. 5 is a schematic diagram of an autostereoscopic display system, including an adjustable autostereoscopic display, a sensor, and a processing circuit, shown according to an exemplary embodiment.

Referring to FIG. 5, autostereoscopic display system 500 is shown according to an exemplary embodiment. Autostereoscopic display system 500 includes adjustable autostereoscopic display 502, processing circuit 504, and sensor 506. Autostereoscopic display 502 may be a 3D television display. Sensor 506 may be a camera and processing circuit 504 may be the processing components of the television. In this embodiment, the tracer beam is emitted by the television display by encoding tracer light in its projections (e.g., projections of light corresponding to a movie scene, etc.) and the camera is configured to detect reflections of light. The tracer beam may be encoded using time gating or spectral or polarization techniques as mentioned herein, or the full light from one or both of the projections may serve as the tracer beam. All components necessary to generate the tracer beam may be embedded within the display components of the television (e.g., a pixel generating device, a micromirror array, a DLP projection system, etc.).

Figure 6:
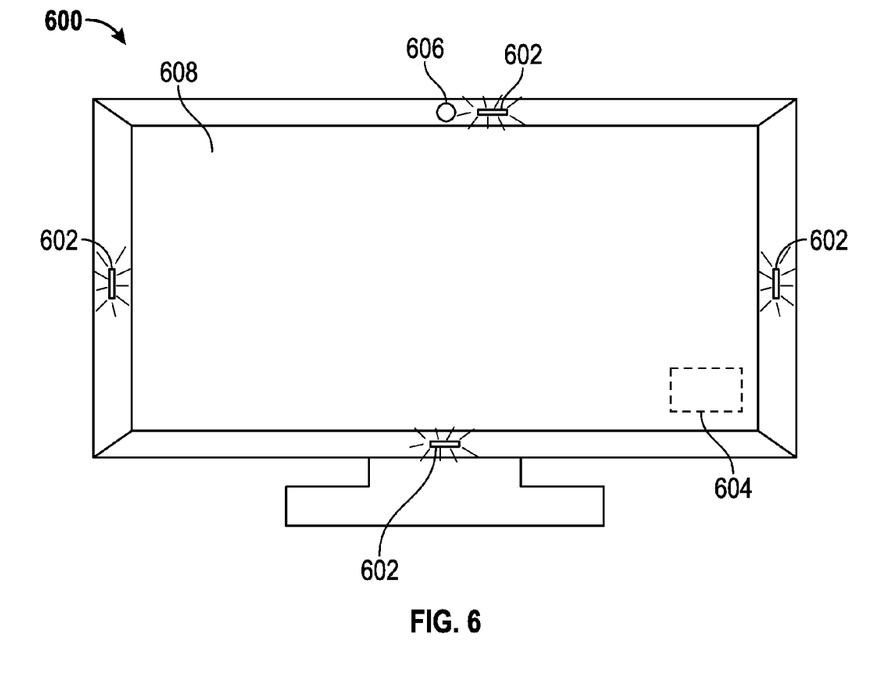
FIG. 6 is a schematic diagram of an autostereoscopic display system, including an adjustable autostereoscopic display, emitters, a sensor, and a processing circuit, shown according to an exemplary embodiment.

Referring to FIG. 6, autostereoscopic display system 600 is shown according to an exemplary embodiment. Autostereoscopic display system 600 includes adjustable autostereoscopic display 608, sensor 606, processing circuit 604, and emitters 602. Autostereoscopic display 608 may be a 3D television display. Sensor 606 may be a camera and processing circuit 604 may be the processing components of the television. Emitters 602 may be ultraviolet LED devices, and may be positioned in various locations around adjustable autostereoscopic display 608. In this manner, tracer beams can be sent from multiple locations on the display. Processing circuit 604 may perform additional analysis utilizing the different locations of the emitters in order to more accurately confirm that the display is properly aimed at a viewer. Processing circuit 604 may track reflections from the different tracer beams in aggregate or individually. Each emitter may be calibrated similarly or differently, and may be configured for different aiming points or impact sites. As an example, each emitter may be configured to use different wavelengths of light. In another example, all emitters may emit tracer beams of the same wavelength.

In one exemplary embodiment, emitters on the left half of a display are configured to aim at viewers positioned on the left half of the display. Similarly, emitters on the right half of a display are configured to aim at viewers positioned on the right half of the display. Emitters in the center of the display are configured to aim at all viewers. In this manner, processing circuit 604 may accept data from all of the emitters and use the data to more accurately aim and confirm projections coming from the display.

Figure 7:
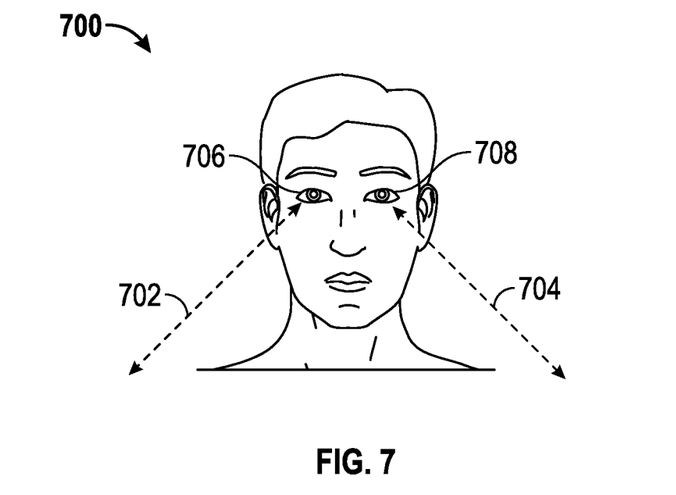
FIG. 7 is a schematic diagram of tracer beams and impact sites, shown according to an exemplary embodiment.

Referring to FIG. 7, desired impact sites 706 and 708 on viewer 700 are shown according to an exemplary embodiment. Tracer beams 702 and 704 are also shown. Desired impact sites 706 and 708 are the right eye and left eye of viewer 700, respectively. The locations of desired impact sites 706 and 708 are determined by a processing circuit (e.g., processing circuit 300 of FIG. 3). The type of desired impact site may be specified by a configuration file (e.g. configuration data 304 of FIG. 3). For example, the type of desired impact site may be a nose, an eye, a forehead, etc. Tracer beams 702 and 704 correspond to the right and left light channels of a projection. As an example, tracer beam 702 may correspond to light intended to reach the right eye of a viewer, and tracer beam 704 may correspond to light intended to reach the left eye of a viewer. The light intended to reach a viewer may be generated by a simultaneous autostereoscopic display (e.g., where the left and right beams are projected simultaneously). In another example, the light intended to reach a viewer may be generated by a sequential autostereoscopic display (e.g., where the left and right beams are projected sequentially). Tracer beams 702 and 704 are depicted as reflecting off of right eye and left eye of viewer 700, respectively. The reflections may be detected by sensor (e.g., sensor 206 of FIG. 2) and used to determine actual impact sites. The actual impact sites of tracer beams 702 and 704 may be compared to desired impact sites 706 and 708. This information is used by the processing circuit to determine if an adjustment to the autostereoscopic display needs to be made. This information is also used to confirm that the autostereoscopic display is accurately aimed, as described above.

Figure 8:
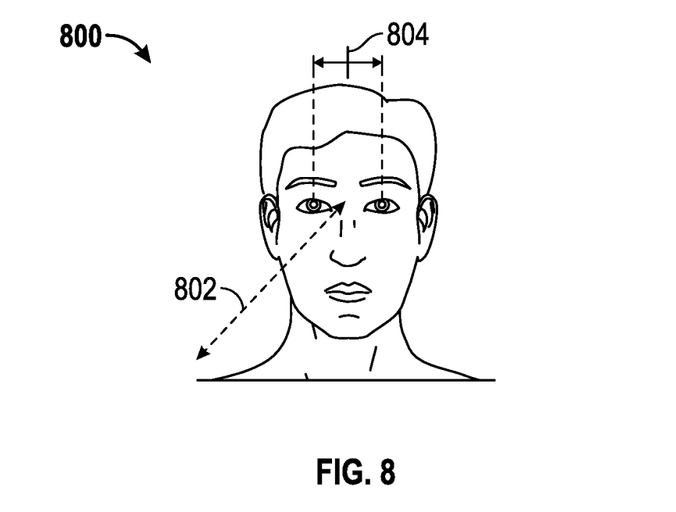
FIG. 8 is a schematic diagram of a tracer beam and an impact site, shown according to an exemplary embodiment.

Referring to FIG. 8, desired impact site 804 on viewer 800 is shown according to an exemplary embodiment. Tracer beam 802 is also shown. Desired impact site 804 is the middle of the forehead of viewer 800. The location of desired impact site 804 is determined by a processing circuit (e.g., processing circuit 300 of FIG. 3). As discussed above, a desired impact site may be also specified by a configuration file (e.g., configuration data 304 of FIG. 3). Tracer beam 802 corresponds to system configured to use a single emitter. As an example, when the desired impact site is configured for a single location on a viewer (e.g., the middle of the forehead, the nose, etc.), the processing circuit may then calculate the locations of the right and left eye using that single location. This can be accomplished any number of ways (e.g., using a number representing the average separation between human eyes, using an offset specified in configuration data, using measurement data from a sensor detecting the eyes of the viewer, etc.) The reflections of tracer beam 802 may be detected by sensor (e.g., sensor 206 of FIG. 2) and used to determine an actual impact site. The actual impact site of tracer beam 802 may be determined compared to desired impact site 804. This information is used by the processing circuit to determine if an adjustment to the autostereoscopic display needs to be made. This information is also used to confirm that the autostereoscopic display is accurately aimed, as described above.

Figure 9:
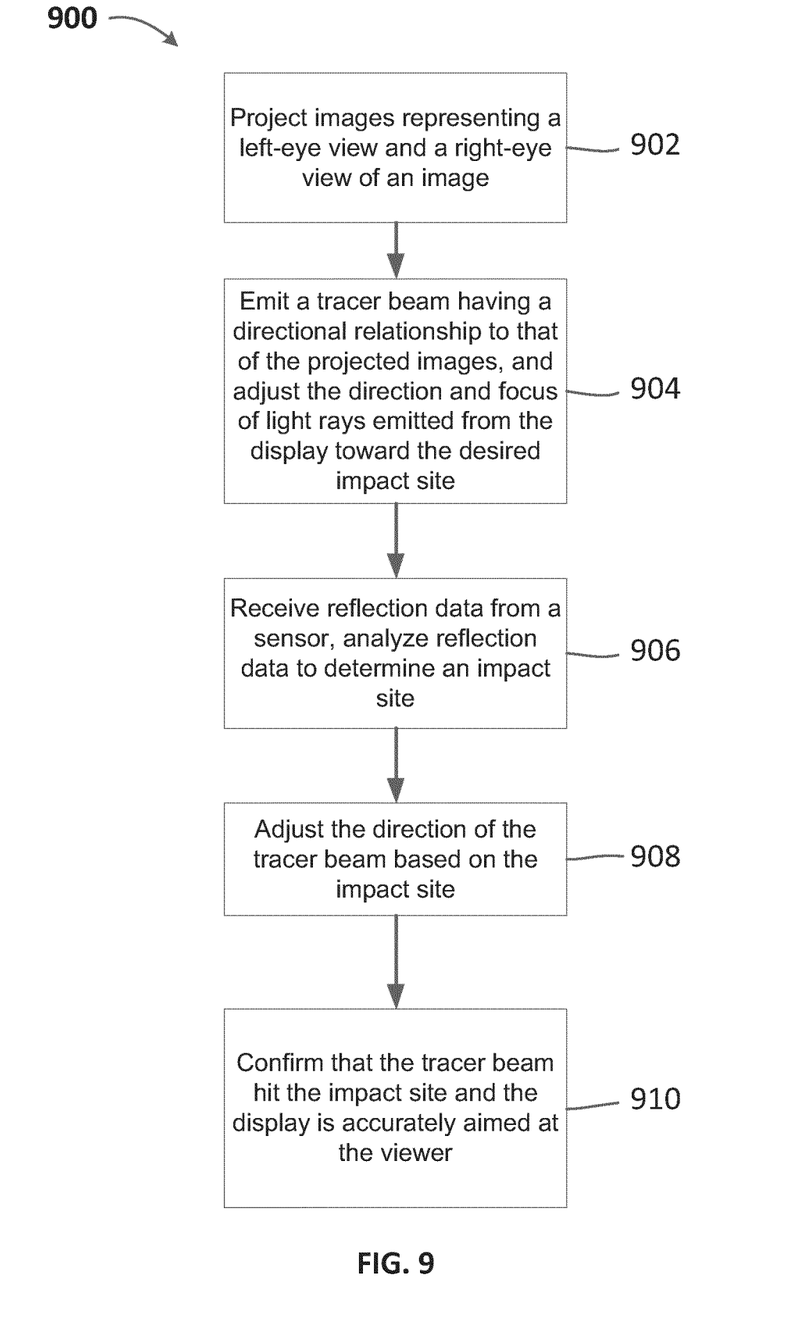
FIG. 9 is a flow diagram of a process for confirming that an adjustable autostereoscopic display is accurately aimed at a viewer, shown according to an exemplary embodiment.

Referring to FIG. 9, a flow diagram of process 900 for confirming that an autostereoscopic display is accurately aimed at a viewer is shown, according to an exemplary embodiment. Process 900 includes projecting images representing a left-eye view and a right-eye view of an image (step 902), emitting a tracer beam having a directional relationship to that of the projected images, and adjust the direction and focus of light rays emitted from the display toward the desired impact site (step 904), receiving reflection data from a sensor, analyze reflection data to determine an impact site (step 906), adjusting the direction of the tracer beam based on the impact site (step 908), and confirming that the tracer beam hit the impact site and the display is accurately aimed at the viewer (step 910).

Figure 10:
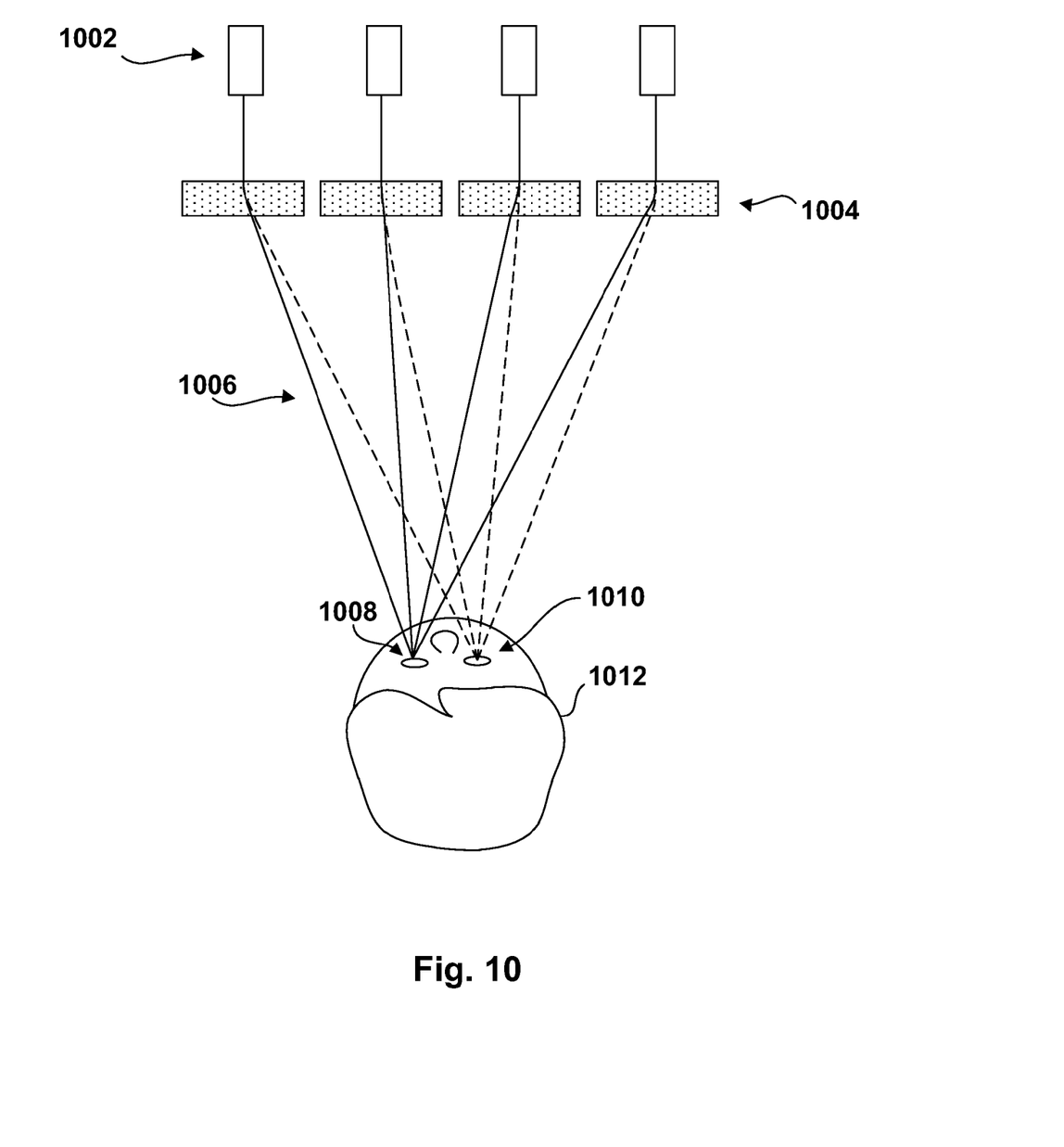
FIG. 10 is a schematic diagram of light rays of an adjustable autostereoscopic display, shown according to an exemplary embodiment.

Referring to FIG. 10, a schematic diagram of light rays 1006 of an adjustable autostereoscopic display is shown according to an exemplary embodiment. The light rays 1006 may consist of scene light, tracer beam light, or both. The autostereoscopic display providing light rays 1006 may be an autostereoscopic display as described herein (e.g., autostereoscopic display 408 of FIG. 4, etc.). In particular, FIG. 10 shows light rays 1006 deflecting towards left-eye 1008 of viewer 1012 at a first time-step (shown as solid lines), and light rays 1006 deflecting towards right-eye 1010 of viewer 1012 at a second time-step (shown as dashed lines). Although the time steps are labeled "first" and "second", no intended order of operations should be implied from the labels "first" or "second". Light is emitted from light sources 1002, through optical deflectors 1004 towards the eyes of viewer 1012. As an example, light sources 1002 may be LED devices, or any other suitable light sources. Although optical deflectors 1004 are shown as separate devices, optical deflectors 1004 may be part of a single-device deflection system. The relative size of objects, such as the light sources and optical deflectors, are not to any scale and may not be in proportion as those in a particular implementation.

Figure 11:
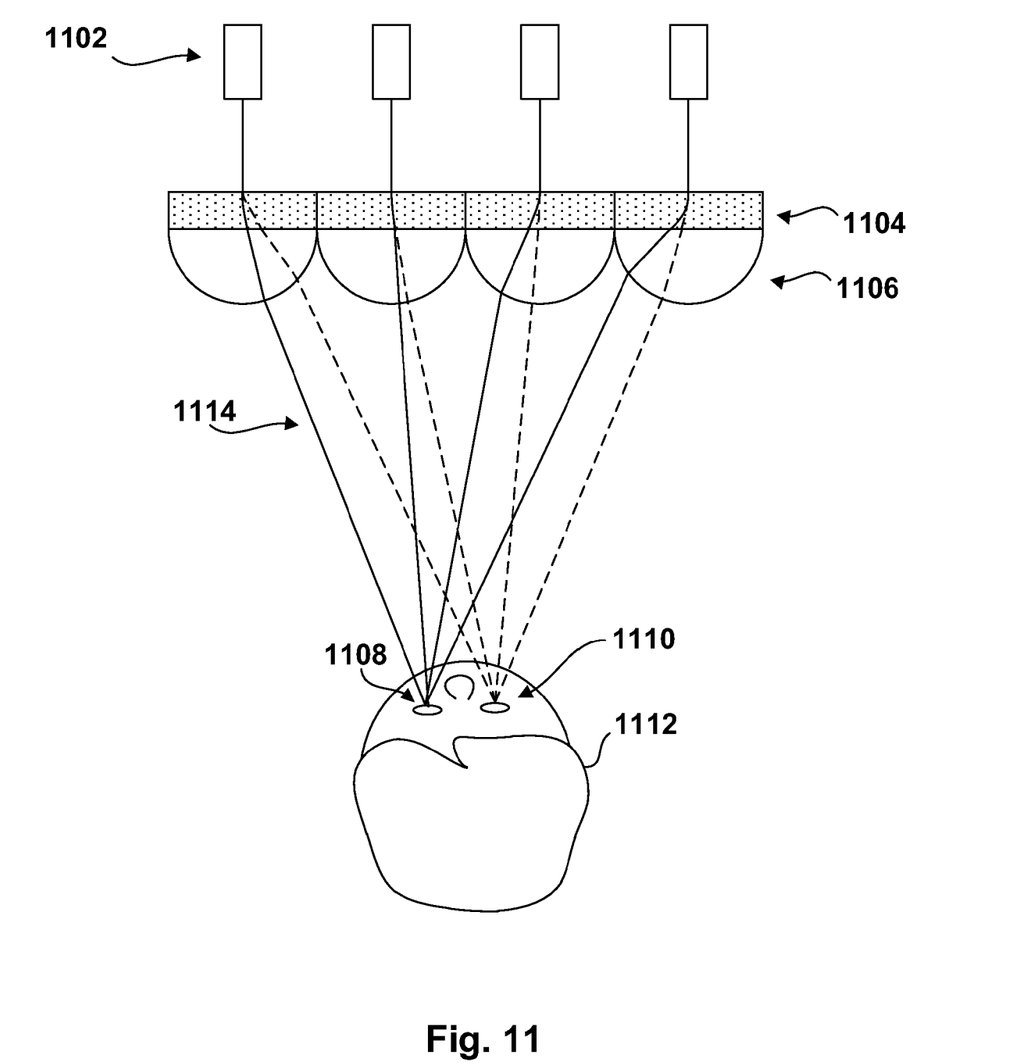
FIG. 11 is a schematic diagram of light rays of an adjustable autostereoscopic display, shown according to an exemplary embodiment.

Referring to FIG. 11, a similar schematic diagram as FIG. 10 of light rays 1114 is shown, as implemented by an autostereoscopic display utilizing a lenticular array. The light rays 1114 may consist of scene light, tracer beam light, or both. The autostereoscopic display providing light rays 1114 may be an autostereoscopic display as described herein (e.g., autostereoscopic display 502 of FIG. 5, etc.). FIG. 11 depicts light sources 1102, which emit light rays 1114 that transmit through optical deflectors 1104 and lenticules 1106 towards the eyes of viewer 1112. The optical deflectors may be electrically or mechanically controlled devices. The optical deflectors may be mechanically controlled devices, using lateral offsets between the light sources 1102 and lenticules 1106 (or parallax barriers) to direct projections into desired directions. When used to adjust the display's aimpoint (e.g., to track a moving viewer) the optical deflectors (whether active or passive) are configured to apply corresponding angular deflections to both the projection beams and the tracer beam. Light rays 1114 are shown as deflecting towards left-eye 1108 of viewer 1112 at a first time-step (shown as solid lines), and light rays 1114 deflecting towards right-eye 1110 of viewer 1112 at a second time-step (shown as dashed lines). Although the time steps are labeled "first" and "second", no intended order of operations should be implied from the labels "first" or "second". The relative size of objects, such as the lenticules and light sources, are not to any scale and may not be in proportion as those in a particular implementation. As shown, lenticules 1106 passively (i.e., without requiring power or control) deflect the light rays. In embodiments using lenticules, parallax barriers, and/or other non-controlled optical elements, the system may be configured to adjust for any optical effects. As an example, the system may adjust light deflection, obstruction, scattering, absorption, reflection, polarization, etc. In such an embodiment, the system may be programmed either with a particular adjustment or with instructions for automatically determining an appropriate adjustment. A particular adjustment may also be stored within a configuration data file (e.g., configuration data 304 of FIG. 3). As another example, a system may calibrate optical deflectors by using a tracer beam, and implementing the systems and methods described herein. In this manner, such a system may actively adjust the deflection system to confirm that light rays 1114 representing a left-eye view and a right-eye view hit the left eye location and right eye location of viewer 1112, respectively.

It should be understood, that some embodiments may use a sequence of timing other than that as depicted in FIGS. 10-11. For example, if one pixel must display views to two viewers, then, while the autostereoscopic display (e.g., autostereoscopic display 502 of FIG. 5) projects the right-eye view of the images, the processing circuit of the display (e.g., processing circuit 300) may send appropriate signals to the display's deflection system to cycle through deflecting images towards each viewer's right eye. Such a configuration may allow the autostereoscopic display to sequence at the same rate, regardless of how many viewers are watching, without employing separate pixels for each viewer. Other implementations are also envisioned (e.g., multiple sets of pixels corresponding to different views, etc.). The systems and methods disclosed herein are not limited to a particular implementation or configuration of pixels.

Figure 12:
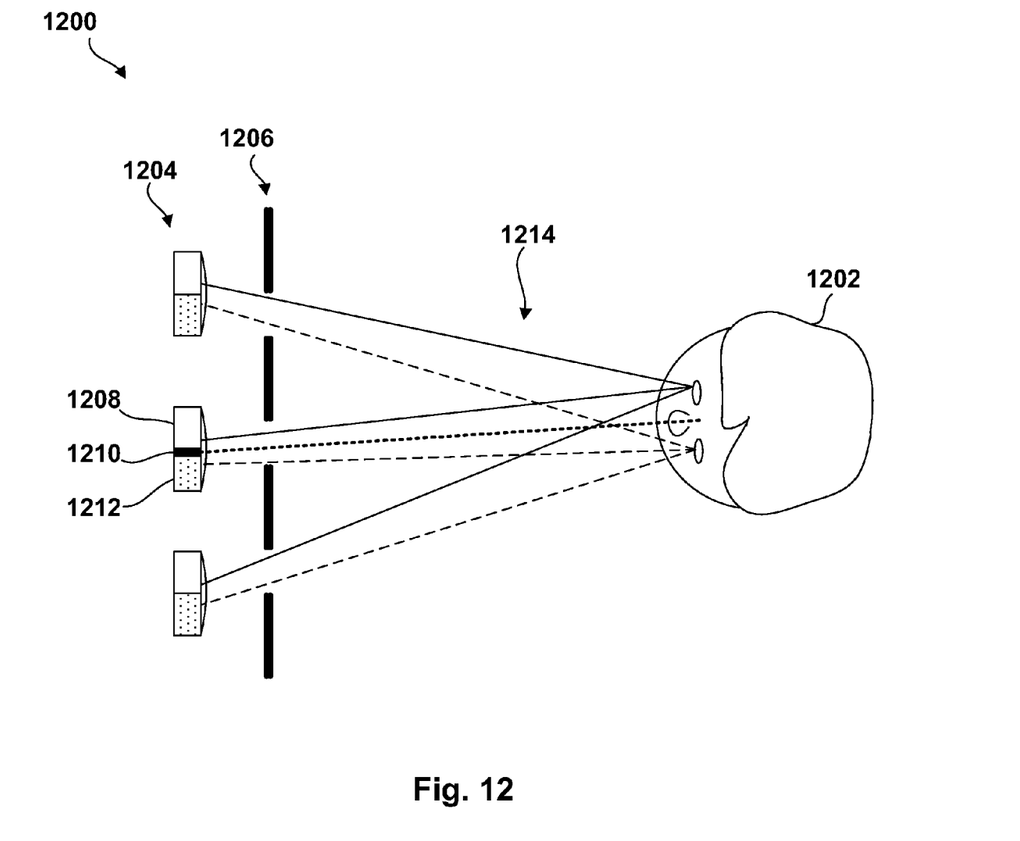
FIG. 12 is a schematic diagram of a projection system of an adjustable autostereoscopic display, shown according to an exemplary embodiment.

Referring to FIG. 12, a schematic diagram of projection system 1200 of an adjustable autostereoscopic display is shown according to an exemplary embodiment. Light rays 1214 may consist of projection beams (e.g., scene light), tracer beam light, or both. Projection system 1200 includes source array 1204 containing light sources, and beam defining array 1206 containing beam defining elements (e.g., parallax barriers, collimator slits, lenticules, etc.). In one embodiment, source array 1204 and beam defining array 1206 are arranged in parallel and are closely spaced apart. Source array 1204 may include light sources defining display pixels that correspond to a left-eye view and a right-eye view for viewer 1202 (e.g., pixel sources 1208 and 1212, etc.). Source array 1204 may further include one or more emitter sources (e.g., emitter 1210) used to generate a tracer beam. Light sources and emitter sources may utilize shared components, or may be separate. Beam defining array 1206 may contain elements which interact with source array 1204 to form the projection beams as well as one or more elements which interact with the emitter(s) (e.g., emitter 1210) to form one or more tracer beams. By occupying fixed locations on common array surfaces, the projection beams and the tracer beam can be configured to have a defined directional relationship (e.g., the tracer beam may be midway between left-eye view and right-eye view projections, or may be above or below the projections, etc.). As the two surfaces are laterally or angularly displaced in order to steer the beams towards viewer 1202, the directional relationship between the projection beams and the tracer beam is maintained.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. An autostereoscopic display system, comprising:
   an adjustable autostereoscopic display configured to project images representing a left-eye view and a right-eye view of an image;
   an emitter configured to emit a tracer beam having a directional relationship to the projected images;
   a sensor configured to detect reflections of the tracer beam; and
   a processing circuit configured to:
      control an emission of the tracer beam to emit the tracer beam when the left-eye and right-eye views are not projected;
      receive feedback data from the sensor;
      use the feedback data to:
         determine an impact site on the viewer corresponding to the tracer beam; and
         adjust a direction of the tracer beam based on the impact site to intercept a desired impact site of the viewer.

2. The system of claim 1, wherein the sensor includes a camera.

3. The system of claim 1, wherein the tracer beam is emitted in a direction that is the same as the projected images representing the left-eye view.

4. The system of claim 1, wherein the tracer beam is emitted in a direction that is the same as the projected images representing the right-eye view.

5. The system of claim 1, wherein the tracer beam is emitted in a direction that is between the projected images representing the left-eye view and right-eye view.

6. The system of claim 1, wherein the tracer beam is emitted in a direction that is above the projected images representing the left-eye view and right-eye view.

7. The system of claim 1, wherein the tracer beam is emitted in a direction that is below the projected images representing the left-eye view and right-eye view.

8. The system of claim 1, wherein the tracer beam comprises at least one of infrared light, ultraviolet light, and visible light of a narrow-bandwidth.

9. The system of claim 1, wherein the tracer beam comprises a pulse of light.

10. The system of claim 1, wherein emission of the tracer beam is controlled based on a timing pattern, the timing pattern based on a schedule.

11. The system of claim 1, wherein the processing circuit is further configured to:
    determine at least one of a left eye location and a right eye location of the viewer;
    determine an aiming point corresponding to at least one of the left eye location and the right eye location; and
    adjust the autostereoscopic display using the aiming point.

12. A method of aiming stereoscopic images, comprising:
    configuring an adjustable autostereoscopic display to project images representing a left-eye view and a right-eye view of an image;
    controlling an emission of a tracer beam having a directional relationship to the projected images, wherein the tracer beam is emitted when at least one of the left-eye and right-eye views are not projected;
    receiving feedback data from a sensor configured to detect reflections of the tracer beam; and
    using the feedback data to:
        determine an impact site on the viewer corresponding to the tracer beam; and
        adjust a direction of the tracer beam based on the impact site.

13. The method of claim 12, further comprising:
    determining at least one of a left eye location and a right eye location of the viewer;
    determining an aiming point corresponding to at least one of the left eye location and the right eye location; and
    adjusting the autostereoscopic display using the aiming point.

14. The method of claim 13, wherein the processing circuit is further configured to determine an offset using the aiming point and a direction of at least one of the projected images representing the left-eye view and the right-eye view.

15. The method of claim 14, wherein the processing circuit is further configured to calibrate the autostereoscopic display, wherein the calibration comprises adjusting the offset using the impact site.

16. The method of claim 15, wherein the calibration is based on an activation of the autostereoscopic display.

17. The method of claim 15, wherein the calibration occurs according to a time limit.

18. The method of claim 15, wherein the calibration occurs according to a schedule.

19. The method of claim 15, wherein the calibration occurs according to a calibration monitoring system of the autostereoscopic display.

20. The method of claim 15, wherein the calibration occurs according to a user command.

21. The method of claim 12, wherein the adjustable autostereoscopic display includes a lenticular array.

22. The method of claim 12, wherein the adjustable autostereoscopic display includes a parallax-barrier.

23. The method of claim 12, wherein the adjustable autostereoscopic display includes optical splitters.

24. The method of claim 12, further comprising controlling emissions of a plurality of tracer beams, wherein each tracer beam comprises light.

25. The method of claim 24, wherein the emissions of the plurality of tracer beams are controlled individually.

26. The method of claim 24, wherein the emissions of the plurality of tracer beams are controlled in aggregate.

27. A non-transitory computer-readable medium having instructions stored thereon, the instructions comprising:
    instructions to configure an adjustable autostereoscopic display to project images representing a left-eye view and a right-eye view of an image;
    instructions to control an emission of a tracer beam having a directional relationship to the projected images, wherein the instructions control the emission of the tracer beam to emit the tracer beam when the left-eye and right-eye views are not projected;
    instructions to receive feedback data from a sensor configured to detect reflections of the tracer beam; and
    instructions to use the feedback data to:
        determine an impact site on the viewer corresponding to the tracer beam; and
        adjust a direction of the tracer beam based on the impact site.

28. The non-transitory computer-readable medium of claim 27, wherein the tracer beam comprises infrared light.

29. The non-transitory computer-readable medium of claim 27, wherein the tracer beam comprises ultraviolet light.

30. The non-transitory computer-readable medium of claim 27, wherein the tracer beam comprises visible light of a narrow-bandwidth.

31. The non-transitory computer-readable medium of claim 27, wherein the tracer beam is of an intensity greater than a maximum intensity of the images representing the left-eye view and the right-eye view.

32. The non-transitory computer-readable medium of claim 27, wherein the instructions further comprise instructions to control emissions of a plurality of tracer beams, wherein each tracer beam comprises light.

33. The non-transitory computer-readable medium of claim 32, wherein the emissions of the plurality of tracer beams are controlled individually.

34. The non-transitory computer-readable medium of claim 32, wherein the emissions of the plurality of tracer beams are controlled in aggregate.

35. The non-transitory computer-readable medium of claim 27, wherein the tracer beam is a non-visible tracer beam.

* * * * *